(12) United States Patent
Lackey et al.

(10) Patent No.: US 8,541,039 B2
(45) Date of Patent: Sep. 24, 2013

(54) WATER PURIFYING AND FLAVOR INFUSION DEVICE

(75) Inventors: Robert William Lackey, Hickory, NC (US); Robert Charles Beckman, Vale, NC (US); Andrew Frederick Fay, Granite Falls, NC (US)

(73) Assignee: Protect Plus LLC, Hickory, NC (US)

( * ) Notice: Subject to any disclaimer, the term of this patent is extended or adjusted under 35 U.S.C. 154(b) by 85 days.

(21) Appl. No.: 13/151,879

(22) Filed: Jun. 2, 2011

(65) Prior Publication Data

US 2011/0300275 A1 Dec. 8, 2011

Related U.S. Application Data

(60) Provisional application No. 61/350,832, filed on Jun. 2, 2010, provisional application No. 61/356,386, filed on Jun. 18, 2010.

(51) Int. Cl.
| | |
|---|---|
| *A23L 1/20* | (2006.01) |
| *A23J 1/09* | (2006.01) |
| *A23J 1/00* | (2006.01) |
| *C12C 5/02* | (2006.01) |
| *A47J 31/00* | (2006.01) |
| *A47J 31/06* | (2006.01) |
| *A47J 31/02* | (2006.01) |

(52) U.S. Cl.
USPC ............. 426/394; 426/431; 426/490; 426/66; 426/86; 99/323; 99/279; 99/295; 99/275; 99/316

(58) Field of Classification Search
USPC ....... 426/66, 126, 431, 490, 394, 86; 99/275, 99/289, 295, 316, 323, 279, 319, 322; 210/205, 210/282, 474
See application file for complete search history.

(56) References Cited

U.S. PATENT DOCUMENTS

| 4,660,741 A | 4/1987 | Kirschner et al. |
| 4,979,654 A | 12/1990 | Nohren, Jr. |

(Continued)

FOREIGN PATENT DOCUMENTS

| AU | 649600 B3 | 5/1994 |
| WO | WO2007088523 A2 | 8/2007 |

(Continued)

OTHER PUBLICATIONS

Prodyne Fruit Infusion Natural Fruit Flavor Pitcher (http://www.casa.com/p/prodyne-fruit-infusion-natural-fruit-flavor-pitcher-93-oz-239757?site=CA&utm_source=Google&utm_medium=cpc_C&utm_term=ZPV-3485&utm_campaign=GoogleAW&CAWELAID=1309130626&utm_content=pla&adtype=pla&cagpspn=pla). Sep. 2009.*

(Continued)

*Primary Examiner* — Rena Dye
*Assistant Examiner* — Lela S Williams
(74) *Attorney, Agent, or Firm* — Clements Bernard PLLC; Seth L. Hudson

(57) ABSTRACT

A water purifying and flavor infusion device that includes a lower reservoir for storing filtered water, and a pitcher top removably affixed to the lower reservoir. The pitcher top includes a lid, an upper reservoir, and a filter housing affixed to and extending below the upper reservoir. The filter housing is adapted to contain a filter cartridge wherein the upper reservoir and the filter housing are in liquid communication. The device also includes an infusion tube for infusing filtered water with an additive.

13 Claims, 7 Drawing Sheets

(56) References Cited

U.S. PATENT DOCUMENTS

| | | |
|---|---|---|
| 4,986,901 A | 1/1991 | Nohren, Jr. |
| 5,318,791 A | 6/1994 | Millman et al. |
| 5,724,883 A | 3/1998 | Usherovich |
| 5,922,378 A * | 7/1999 | Kagan et al. .................. 426/132 |
| 6,527,109 B2 | 3/2003 | Schoo et al. |
| 6,733,669 B1 | 5/2004 | Crick |
| 7,670,479 B2 | 3/2010 | Arett et al. |

FOREIGN PATENT DOCUMENTS

| | | |
|---|---|---|
| WO | WO2010055775 A1 | 5/2010 |
| WO | WO2010055848 A1 | 5/2010 |
| WO | WO2010055828 A1 | 6/2011 |

OTHER PUBLICATIONS

Amazon.com; reviews, Prodyne Fruit Infusion 93-Ounce Natural Fruit Flavor Pitcher. 2009.*

* cited by examiner

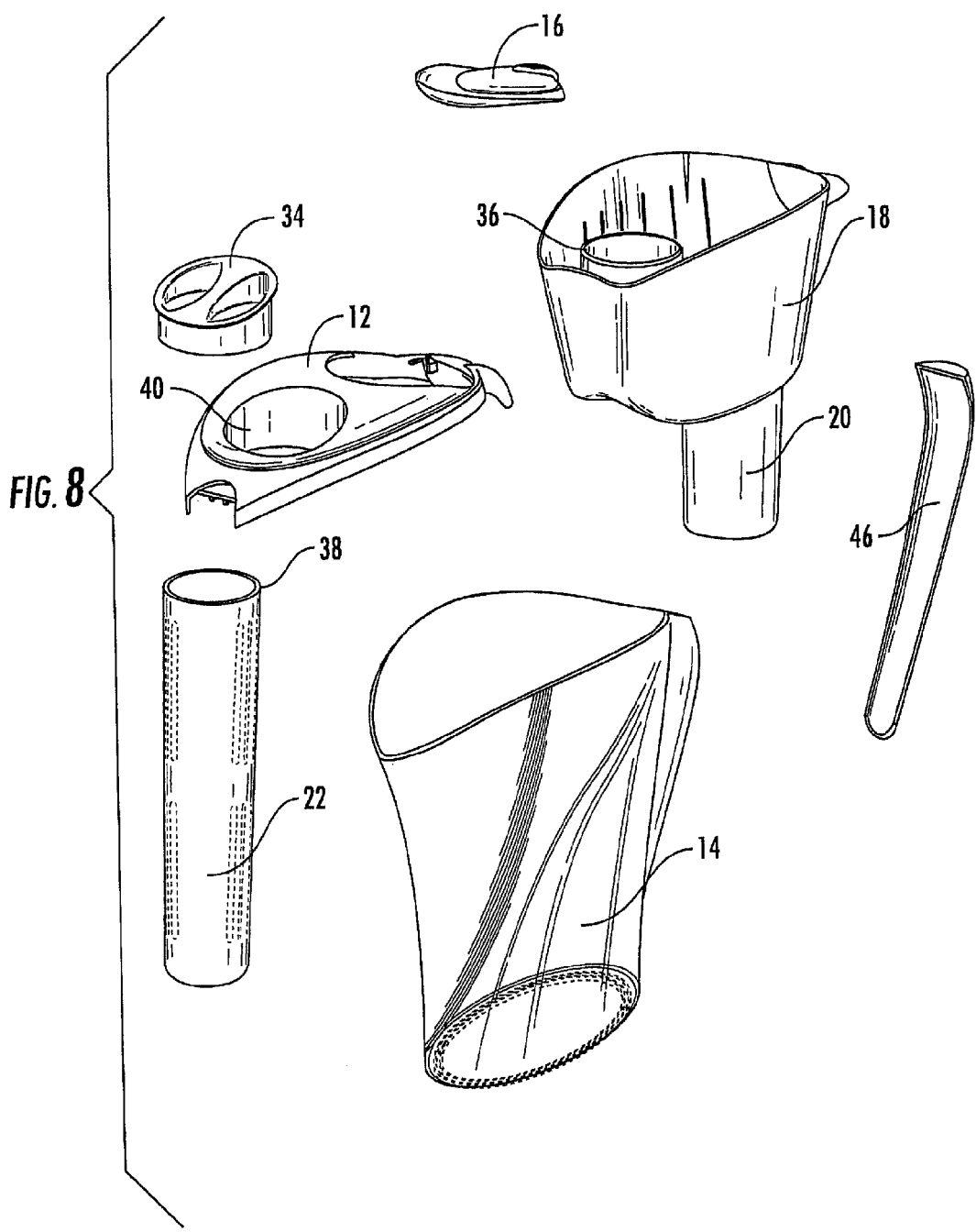

WATER PURIFYING AND FLAVOR INFUSION DEVICE

CROSS REFERENCE TO RELATED PATENT APPLICATION

The current application claims the benefit of the earlier priority filing date of provisional applications, Ser. No. 61/350,832 that was filed on Jun. 2, 2010 and Ser. No. 61/356,386 that was filed on Jun. 18, 2010.

FIELD OF THE INVENTION

The present invention is generally directed to a water purifying and flavor infusion device typically used in residential applications or in any application where a filtered and flavored liquid is desired. The invention is more specifically directed to a water filtration pitcher that possesses the ability to infuse water with flavor. The invention allows the user to infuse fruit, vegetables, or herbs into filtered water via a removable infusion tube integral with the pitcher.

BACKGROUND OF THE INVENTION

Water is a basic necessity to sustain all life. Every living thing on the planet, animal and plant, needs water to survive. As such, the need for clean, pure water will never decrease. In fact, as populations grow, the need for clean, pure water will only increase. Recently, society has begun to focus more on the purity of water for both drinking and other applications. The recent success of the bottled water industry conclusively shows that the desire for pure water is increasing within the population. Pure water is bottled by a multitude of manufacturers and is sold in many places throughout the world. Demand for pure bottled water is increasing and shows no signs of waning.

It is widely accepted that drinking water as opposed to other liquids, even those based on water, has many health benefits. The medical community in the United States periodically issues statements that indicate the average person does not drink enough water. Unlike soda, milk, and other beverages, water is available to most people simply by turning on a faucet. Despite this wide availability of potable water, most people simply do not drink enough.

Typically, a local utility company provides potable water to people. The utility company is generally responsible for ensuring that the water provided to homes and businesses is clean, pure, and free from harmful organisms. Indeed, many people rely solely on the public water systems to guarantee that the water flowing into their homes and businesses is fit for consumption. Typically, the municipal body responsible for providing water to the populace will have various treatment and purification procedures to help ensure the quality of the water provided to consumers. These systems can include large, industrial scale filters, treatment tanks, and other water processing devices. Unfortunately, sometimes these systems can break down, or these systems can miss a contaminant leaving the treated water with various forms of impurities.

Since water is such a vital part of people's everyday needs, the desire for clean, pure water will continue to grow, and will likely never diminish. Most municipal treatment facilities do an adequate job in cleaning and purifying water, however, there is concern that the municipal systems responsible for providing clean, pure water are simply overworked. Filtration of water on such a large scale can sometimes lead to water that contains particulate filtrate material left over from where the water was originally filtered. Moreover, some of the treatment methods and additive chemicals used in the cleaning and purifying of water can leave the water containing undesirable contaminants, odors, or tastes.

Municipal water treatment systems typically focus on removing various contaminants from water in order to provide clean, potable water for human consumption. Large scale purification of water is designed to reduce or eliminate the concentration of particulate matter including suspended particles, parasites, bacteria, algae, viruses, and fungi. Also, the municipal treatment facilities have apparatuses and methods to remove a wide range of dissolved and particulate material picked up by water from the surfaces the water may have made contact with after falling as rain and flowing to the treatment facility.

In the United States, the government typically sets the standards for drinking water quality. The government requires that various standards designed to ensure the drinking water is safe for consumption are met. In other countries around the world, however, the standards and thresholds for certain contaminants are not as stringent. Thus the warning of "don't drink the water," in various places around the world. Unfortunately, because many countries do not require the same standards for their water that the United States requires, many of the world's countries have water that contains harmful organisms or other impurities.

According to a 2007 World Health Organization report, 1.1 billion people lack access to an improved drinking water supply. The WHO estimates that 88% of the 4 billion annual cases of diarrheal disease are attributed to unsafe water and inadequate sanitation and hygiene. Further, 1.8 million people die from diarrheal diseases each year. The WHO further estimates that 94% of these diarrheal cases are preventable through modifications to the environment, including access to safe water. The WHO concludes that a few simple techniques for treating water at home, such as chlorination, filters, and solar disinfection, combined with storing it in safe containers could save a huge number of lives each year.

In most cases, it is not possible to tell whether water is of an appropriate quality by visual examination. If water has a cloudy appearance or there are visible particles present, then the water is most likely unsafe to drink. However, many dangerous contaminants are simply too small to be visible to the naked eye. It is impossible to know that the water is clean, pure, and fit to drink simply by looking at it. Thus, some simple procedures such as boiling or the use of a household activated carbon filter have been devised in an attempt to clean and purify water for drinking. Unfortunately, these simple steps are not sufficient for treating all the possible contaminants that may be present in water from an unknown source. Even natural spring water, which in the nineteenth century was considered safe for all practical purposes, must now be tested before determining what kind of treatment, if any, is needed. A chemical analysis of water, while expensive, is the only way to obtain the information necessary for deciding on the appropriate method of purification.

In addition to concerns over the quality of water found in various parts of the world, health professionals are continually espousing the need for people in every country to drink more water. In the United States, a person's choice of available beverages is immense. In addition to water, a consumer in the United States is often confronted with a daunting number of choices of beverages. For example, one can choose soda, milk, fruit juice, energy drinks, beer, wine, or liquor. And, further complicating the matter, there are a multitude of variations on these categories of drinks available to people. With soda alone, one has many choices. Often times, people choose to drink a soda or fruit juice (often times not even made from real fruit) instead of selecting pure water.

One of the reasons people elect to drink beverages other than water are that these other drinks contain salts, caffeine, colors, acids, high fructose corn syrup, and other flavors that tend to entice people. Most of these products are based on water, but contain so many additives that the result is a drink that, while based on water, contains large amounts of unhealthy additives. For example, unlike pure water that has zero calories, zero sugars, and zero sodium in twelve ounces, one twelve-ounce can of cola may have 140 calories, fifty milligrams of sodium, and thirty-nine grams of sugar. These ingredients pose health risks to the average person at large concentrations. Despite the health risks of consuming large amounts of these ingredients, the fact is that to most people, they taste good.

Indeed, water, while undoubtedly very healthy, does not have a distinct taste. Conversely, soda, juice, alcoholic drinks, milk, tea and other drinks have very distinctive tastes that are normally quite appealing to the average person. Moreover, many of the drinks have distinct odors and fragrances that are also appealing to the average person. Recent studies have begun to indicate that a person can even become addicted to ingredients such as sugars and caffeine found in some drinks further influencing that person to select a beverage other than water.

Various efforts to provide additives to water in an effort to increase the appeal of water as a drink have met with reasonable success. Tea, for example, is simply the addition of naturally growing plant matter to hot water. Various ingredients in the plant matter seep into the water thus infusing the water with a pleasant flavor. Many different kinds of teas are now widely available, and people can even combine different teas for their own special blends. Also, the sports drink industry has for years been adding salts and electrolytes to water in an effort to provide a drink that has the benefits of water with the additional benefits found in the salts and electrolytes. However, these prepackaged drinks are already blended and do not provide a means for persons to control the amount of additional substances that are blended with their water.

Various companies have introduced bottled water infused with flavors, vitamins, or other additives. The infused water prepackaged as bottle water, however, has several inherent flaws. The bottles that bottled water is packaged in lead to a significant amount of waste. Either the empty bottles end up in a landfill, or they go through an expensive recycling program. This is a concern to many people who are seeking to minimize detrimental effects on the environment. Further, even if a consumer wanted to purchase bottled water, the consumer is limited to the flavors, minerals, and other additives that the bottled water manufacturer chooses to put in the bottles. Moreover, the consumer is limited to the specific concentration of the flavors or other additives that come prepackaged in the bottled water. Also, a consumer who purchases flavored bottled water has no way of changing the flavor without buying more bottled water. Once the consumer uses up the bottled water, there is no option to reuse the container the bottled water came in to make more flavored water.

Thus, a need exists for a simple, easy to use device that will ensure that a persons' drinking water is clean, pure, does not contain harmful contaminants, and tastes good. More specifically, a need exists for a water filter device capable of residential use or small commercial use that will allow persons to be assured that any contaminants left in water after the municipal treatment of the water are removed prior to drinking and that will also allow a person to add a flavor or ingredient to the filtered water prior to drinking. More particularly, there are growing desires from people for a water filter for use in residences that will provide clean, purified water to the homeowner and allow the homeowner to control additives in the purified water to enhance taste or health benefits. People want a device that will purify the water prior to its consumption, and allow them to add a flavor additive. Further, people want a device that minimizes the detrimental effects on the environment.

Thus, a need exists for a device that is capable of satisfying these various desires. These desires and goals can be achieved by use of a pitcher equipped with a water filter and a device to transfer an additive to the filtered water. A pitcher provides a user with the ability to store the filtered water in a refrigerator, or transport the filtered water from place to place in a convenient vessel.

U.S. Pat. No. 7,670,479 to Arett et al. ("Arett") discloses and teaches a water pitcher that contains a device for adding additives to water. The Arett device consists of multiple reservoirs that are designed to hold water and additive. When the user picks up the pitcher, the user can activate a pump that will release additive into a receiving vessel along with the water. The additive is kept separate from the water and is never blended while still in the pitcher. Thus, when pouring, the pitcher is actually pouring two liquids, the water and the additive. In another embodiment, the additive is pumped into a second reservoir. As the user tilts the pitcher to pour water out, the additive pours form the second reservoir out of the pitcher as water is poured out of the water reservoir. Again, the additive is not blended with the water while in the pitcher. Arett also discloses that a filter can be incorporated into the pitcher. In this embodiment, Arett teaches that the filter component of the device is used to filter the water prior to addition of the additive in the receiving vessel. Importantly, Arett requires that the pitcher have a surface downstream from the additive dispensing system that is ultrahydrophobic, ultralyophobic, or ultraclean. Arett discloses that this surface keeps the pour spout of the pitcher free from bacteria build up and other contaminants. Arett does not disclose a pitcher that can accommodate mixing an additive with filtered water within the pitcher itself. Rather, the user adds the additive to the receiving vessel as the pitcher is tilted and the water in the pitcher flows out and into the receiving vessel.

U.S. Pat. No. 5,724,883 to Usherovich discloses and teaches an apparatus that provides a way to include an additive in filtered water. Specifically, Usherovich discloses and teaches a coffee maker. The device provides a way to route water into the device and expose the water to an additive, in this case coffee. The additive is added to the water and the water is passed through a standard coffee filter before being directed out of the device into a receiving vessel. This device allows the user to complete the addition of the additive prior to the water exiting the device, but the addition of the additive occurs prior to the water being passed through the filter. Moreover, the filter used in this device is simply a standard paper filter and is designed only to remove particulate matter from the water after the coffee additive is added.

U.S. Pat. No. 4,660,741 to Kirschner et al. ("Kirschner") discloses and teaches yet another device and method to add an additive to filtered water. Kirschner discloses and teaches a post-mix beverage dispenser typically used for carbonated drinks in restaurants. The device includes a flavor concentrate (the additive) and a carbonator to convert the water into carbonated water. The device also includes a filter where the carbonated water is filtered before the addition of the additive. Kirschner also discloses an agitator and means to refrigerate the water in the reservoir.

U.S. Pat. No. 5,318,791 to Millman et al. ("Millman") discloses and teaches a infusion device designed to infuse water with an additive. Millman teaches a vessel that is equipped with a screw-top lid containing a tube that protrudes downwardly into the vessel. A bag containing an additive with a string attached is placed in the vessel and the string is fitted into the tube. The tube ensures that the bag with the additive remains submerged in the water inside the vessel. The device is also equipped with a dispenser for granulated sugar and the like. While this device includes a means to infuse water with an additive, it does not contain a filter. Moreover, the water in the device is not filtered nor does it pass through a filter prior to being poured into a receiving vessel.

While there are methods and devices described in the prior art that allow one to add an additive to filtered water, none of the devices known in the art possesses the advantages of the present invention. Problems with the prior art include the inability to store the filtered water with the additive in a convenient article for home use. Further, the prior art pitcher devices do not allow the mixing of the additive with the filtered water within the pitcher itself. A further problem with the current devices prevalent in the prior art is that the additive is often added prior to filtering the water. Filtering the water after the additive is added is counterproductive, as the filter can remove some of the additive.

Therefore, a need exists for a water pitcher that will filter water and provide a means to add an additive to the filtered water that does not suffer from the disadvantages of water pitchers according to the prior art. Indeed, a water filter pitcher is needed that will allow a user to add an additive to the filtered water and thereby encourage larger consumption of water. Moreover, a need exists for a water filter pitcher that still provides a source of filtered water and allows one to store the water in a refrigerator for repeated uses.

BRIEF SUMMARY OF THE INVENTION

The present invention is generally directed to a water purifying and flavor infusion device typically used in residential applications or in any application where a filtered liquid is desired. The invention is more specifically directed to a water purifying and flavor infusion device in the form of a pitcher that possesses the ability to infuse fruit, vegetables, or herbs into filtered water via a removable vessel.

The present invention is more specifically directed to a water purifying and flavor infusion device that has a lower reservoir for storing filtered water. The device also has a pitcher top removably affixed to the lower reservoir. The pitcher top includes an upper reservoir for storing unfiltered water and a filter housing affixed to and extending below the upper reservoir. The filter housing is adapted to contain a filter cartridge wherein the upper reservoir and the filter housing are in liquid communication so the water can flow from the upper reservoir into the filter housing and then into the filter cartridge where it is filtered before passing into the lower reservoir. In addition, the present invention also has means for infusing filtered water with an additive.

BRIEF DESCRIPTION OF THE SEVERAL VIEWS OF THE DRAWINGS

The drawings in the instant application depict several embodiments of the present invention. The various figures represent aspects of the present invention and the preferred embodiments. Each of the figures will be described in further detail.

FIG. 8 an exploded view of the water purifying and flavor infusion device.

DETAILED DESCRIPTION OF THE INVENTION

Figure 1:
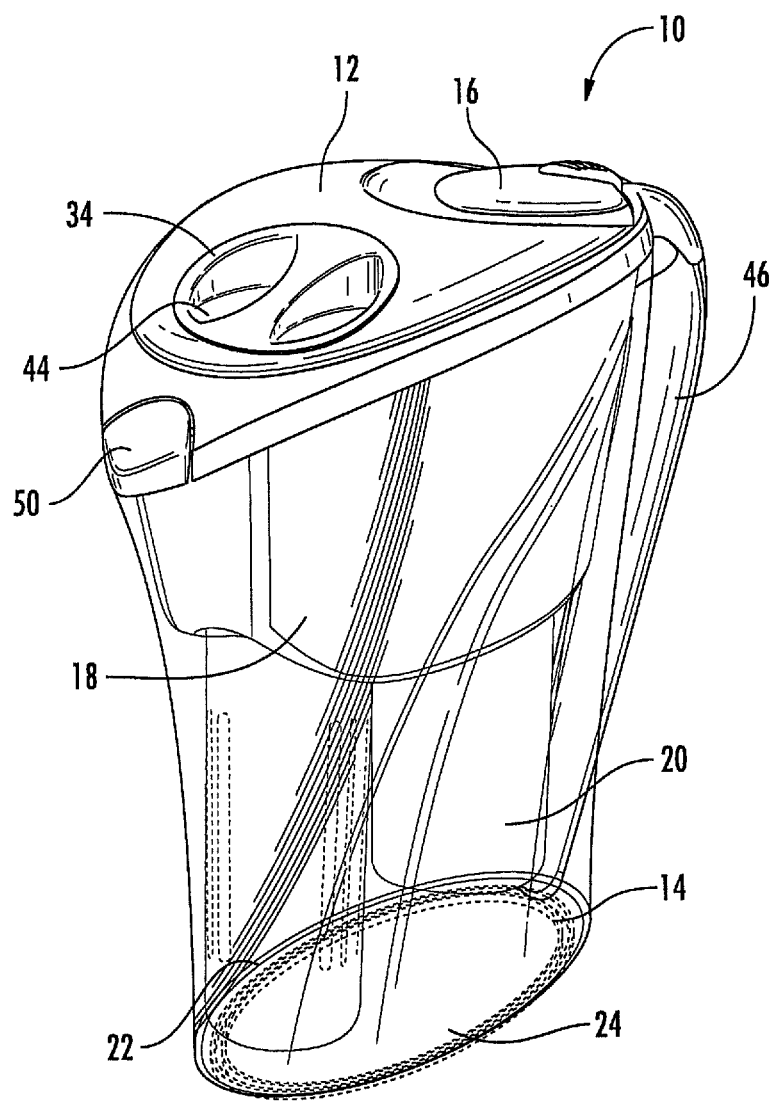
FIG. 1 is a perspective view of the water purifying and flavor infusion device.
Figure 2:
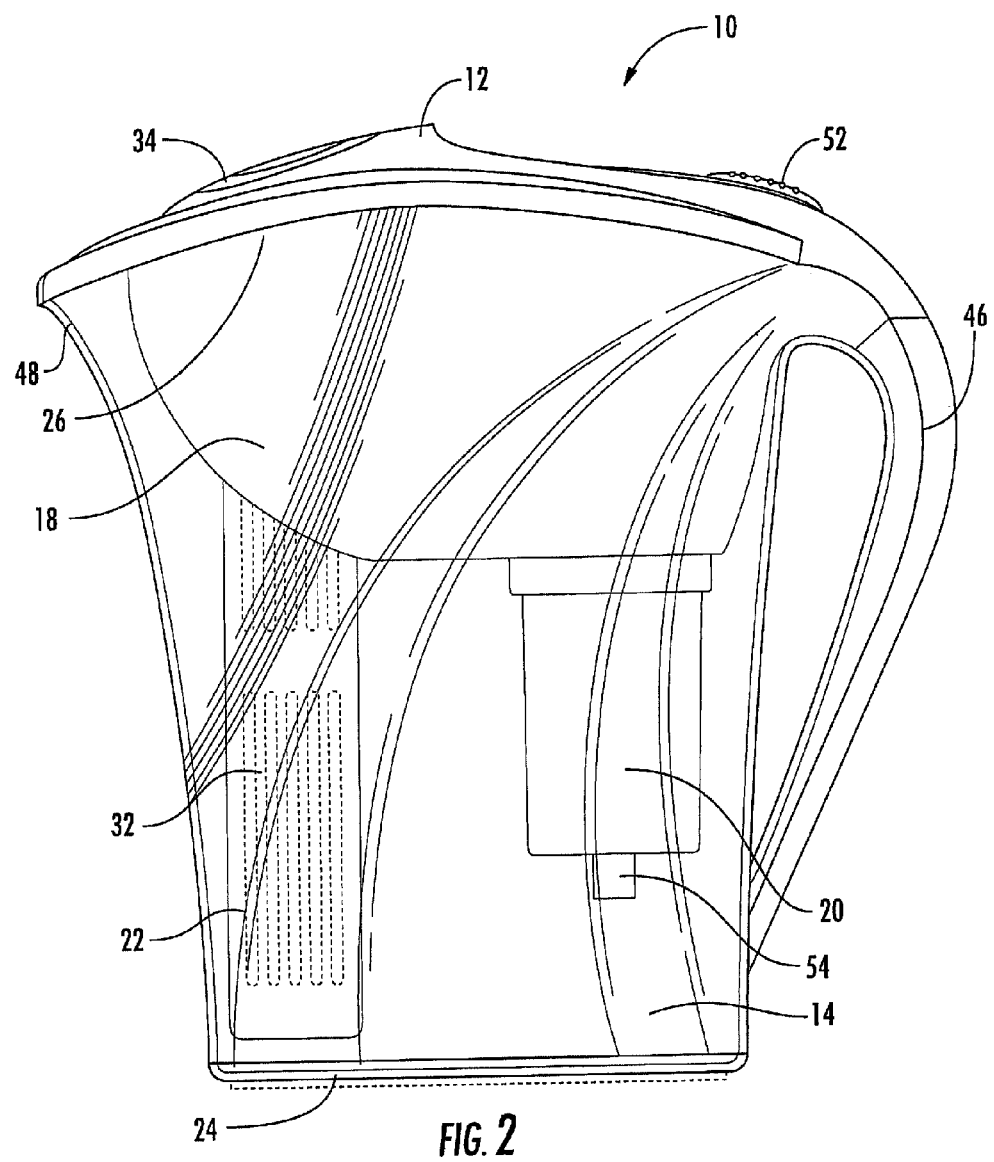
FIG. 2 is a side view of the water purifying and flavor infusion device.
Figure 3:
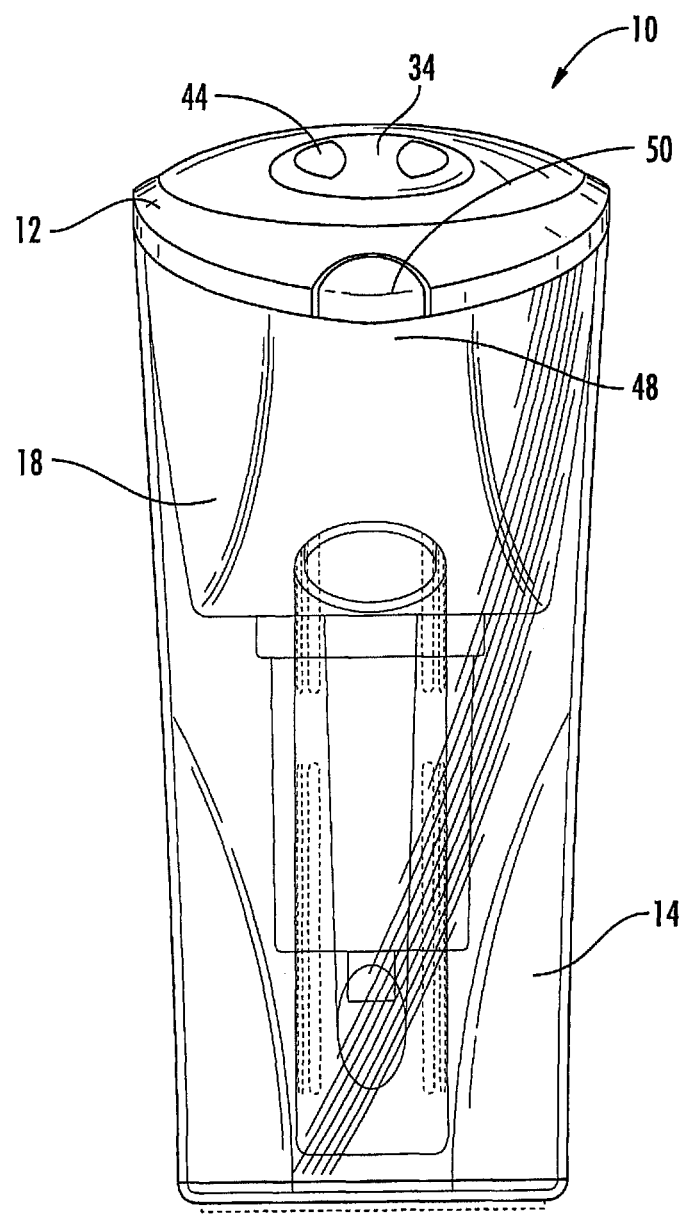
FIG. 3 is a front view of the water purifying and flavor infusion device.
Figure 4:
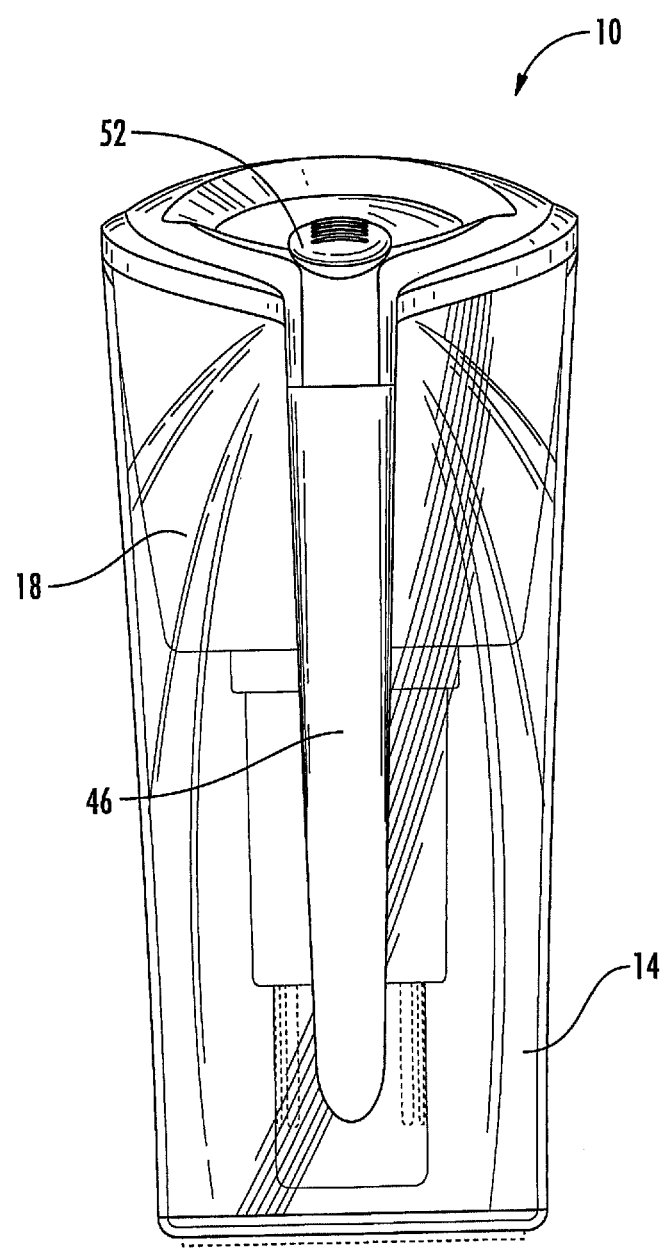
FIG. 4 is a rear view of the water purifying and flavor infusion device.

Referring now specifically to the drawings, an exemplary water purifying and flavor infusion device is illustrated in FIGS. 1, 2, 3, and 4 and is shown generally at reference numeral 10. The device 10 generally comprises a pitcher top 12 and a lower reservoir 14. The pitcher top 12 comprises a lid 16, an upper reservoir 18, a filter housing 20, and an infusion tube 22. The lower reservoir 14 comprises a base 24 and top portion 26. The pitcher top 12 is designed to fit inside of the lower reservoir 14 of the device 10 and is engaged to the top portion 26 of the lower reservoir 14, as shown in FIG. 2. The filter housing 20 is affixed to the upper reservoir 18 and extends downwardly within the lower reservoir 14 and toward the base 24 of the lower reservoir 14. A filter cartridge (not shown) is housed within the filter housing 20.

The lower reservoir 14 is designed to store filtered water. The pitcher top 12 is removably affixed to the lower reservoir 14. The upper reservoir 18 of the pitcher top 12 is designed to store unfiltered water prior to the water passing through the filter housing 20 and the filter cartridge, thus filtering the water and storing the filtered water in the lower reservoir 14. The upper reservoir 18 and the filter housing 20 are in liquid communication with each other so that water can flow from the upper reservoir 18, into the filter housing 20, and then into the filter cartridge where it is filtered prior to passing into the lower reservoir 14.

Figure 5:
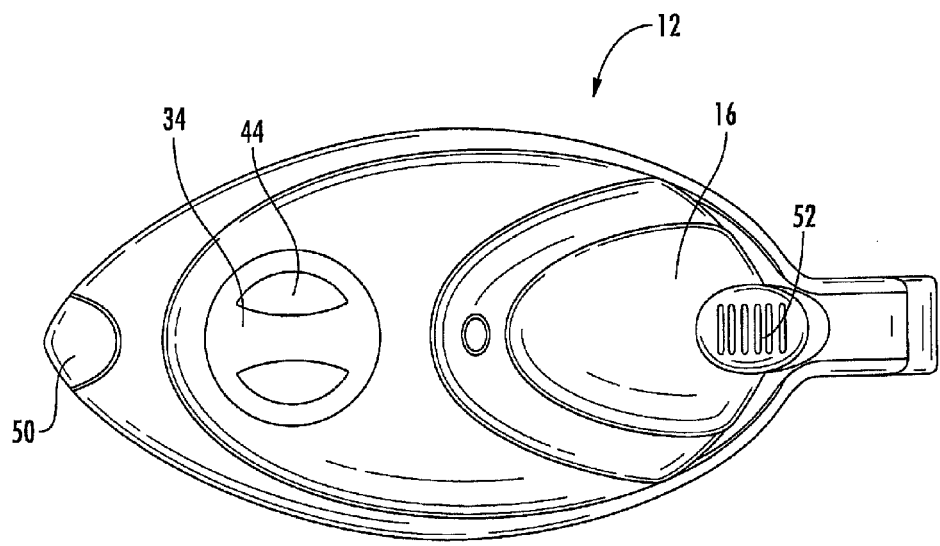
FIG. 5 is a top view of the water purifying and flavor infusion device.
Figure 6:
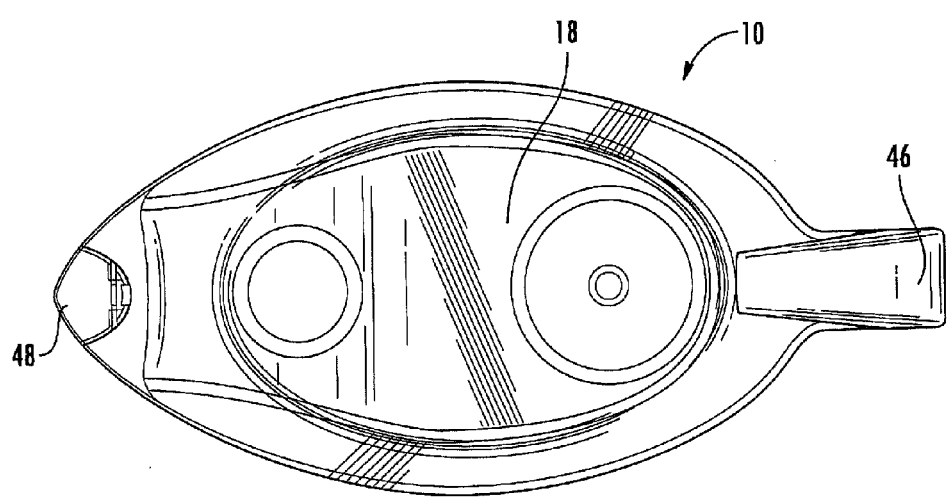
FIG. 6 is a top view of an exemplary embodiment of a water purifying and flavor infusion device.

The lid 16 of the pitcher top 12, as shown in FIGS. 5 and 6, is designed to allow easy access to the upper reservoir 18. When the lid 16 is in the open position, the upper reservoir 18 is exposed and allows the user to pour water directly into the upper reservoir 18. The lid 16 may open by flipping up, sliding, or otherwise moving to expose the upper reservoir 18.

During use, the user opens the lid 16 of the pitcher top 12 and pours water into the upper reservoir 18. As the water is poured into the upper reservoir 18 of the device 10, it flows downwardly through the upper reservoir 18 into the filter housing 20. The water is directed into the filter cartridge and is filtered as it passes through the filter cartridge.

Positioned within the pitcher top 12 is an infusion tube 22. The infusion tube 22 may be integral with the pitcher top 12 or may be removable. The infusion tube 22 is substantially in the form of a hollow tube with openings or slots 32 within the infusion tube 22. The infusion tube 22 has a bottom portion and an upper portion. The bottom portion of the infusion tube 22 is closed, and the upper portion of the infusion tube 22 is configured with a cap 34 that is typically fastened to the pitcher top 12 via a hinge or friction fit. Thus, the infusion tube 22 can be closed once the additive is placed into the infusion tube 22 The infusion tube 22 is configured to fit inside an opening in the pitcher top 12, as shown in FIG. 6, such that additive can be added to the infusion tube 22 without removing the pitcher top 12. Additionally, the infusion tube 22 may be removed without removing the pitcher top 22. This ability to remove the infusion tube 22 allows a user to replenish the additive if a stronger solution is desired. Further, this allows the user to select multiple additives to add to the filtered water.

Figure 7:
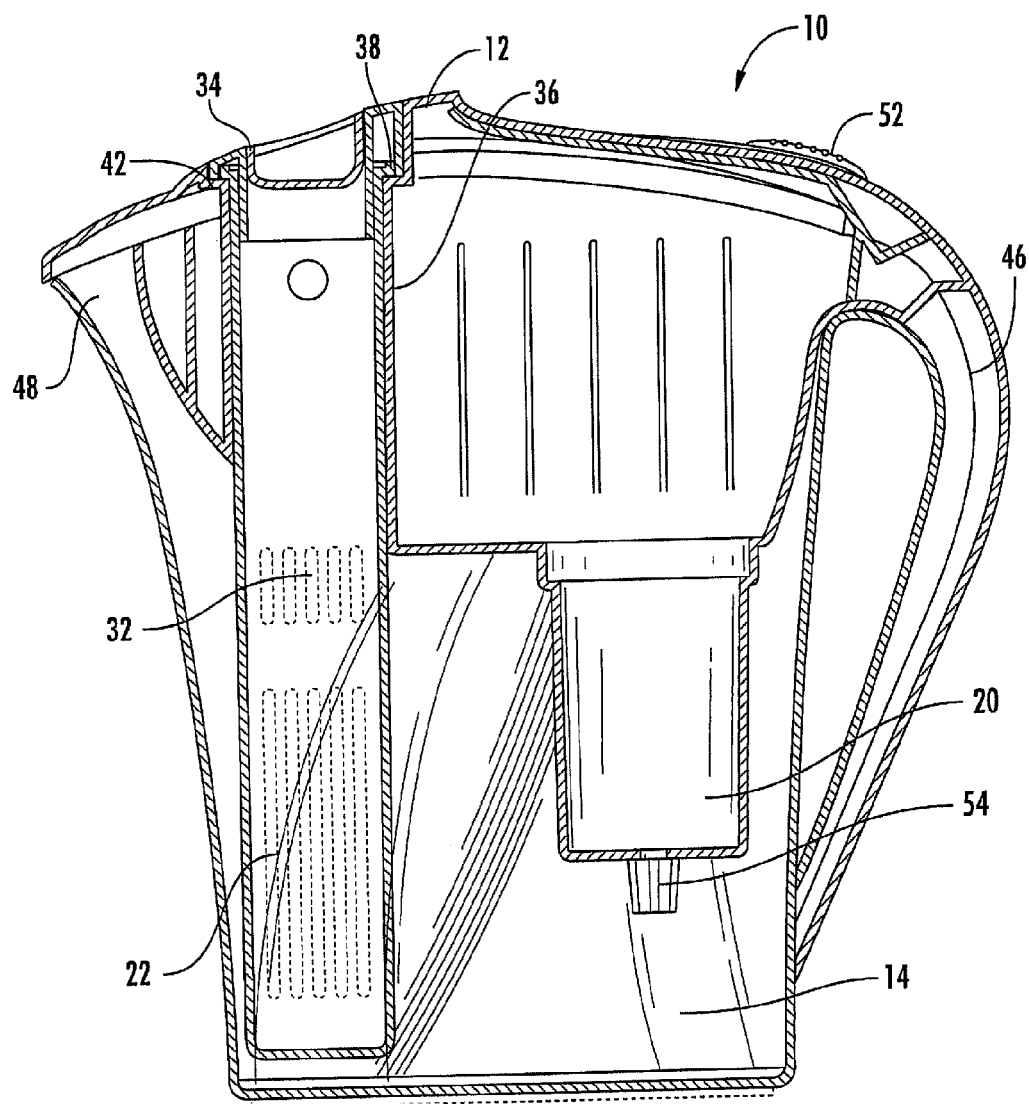
FIG. 7 is a side cut-away view of the water purifying and flavor infusion device.

Preferably, the infusion tube 22 sits within a hollow column 36 formed within the upper reservoir 18, as illustrated in FIG. 7. The column 36 may have a diameter slightly larger than the diameter of the infusion tube 22 for allowing the infusion tube 22 to sit within the column 36. Preferably, both the infusion tube 22 and column 36 are cylindrically shaped, but the infusion tube 22 and column 36 may take the form of any shape. The edges of the column 36 extend above the water line of the upper reservoir for preventing water from entering the column 36 and flowing into the lower reservoir 14 unfiltered. The infusion tube 22 contains an outer ring 38 that sits upon the upper portion of the column 36, allowing the infusion tube 22 to be suspended within the lower reservoir 14.

The pitcher top 12 contains an infusion tube opening 40 for allowing a user to insert additives into the infusion tube 22 without removing the pitcher top 12, as shown in FIG. 8. The opening 40 is designed to receive the cap 34 of the infusion tube 22. A collar 42 is positioned within the opening 40 for receiving the cap 34. The cap 34 is selectively secured within the opening 40 by friction fit. The cap 34 may include two indentations 44 for receiving the fingers of a user and allowing the user to easily remove the cap 34.

The desired additive, such as natural fruit slices, vacuum packs of fruit, vegetables, fruits that may be infused with nutrients or organic supplements, vegetables that may be infused with nutrients or organic supplements, packets of additives, tablets, powder additive, or any other solid form additive may be placed within the infusion tube 22. Alternatively, ice may be inserted into the infusion tube 22 for keeping the filtered water chilled. The bottom of the infusion tube 22 is closed but the bottom portion of the infusion tube contains a plurality of slots 32 or openings that allow water to pass into and out of the infusion tube 22, thus flavoring the water. The infusion tube 22 may have any opening that would allow water to pass into and out of the infusion tube 22, while exposing the filtered water to the fruit, vegetable or the like contained within the infusion tube 22. As illustrated, the infusion tube 22 contains horizontal slots 32, but vertical slots, angled slots, or substantially circular holes may also be utilized in the infusion tube 22.

The rear side of the lower reservoir 14 contains a handle 46. The front side of the lower reservoir 14, meaning the side opposite the rear side, contains a spout 48. The spout 48 is formed out of the lower reservoir 14 and gradually protrudes from the top portion of the lower reservoir 14. The spout 48 is closed by a spout top 50. The spout top 50 is pivotally attached to the lid 16 by a horizontal hinge. The spout top 50 flips open when the device 10 is tilted for pouring water from the lower reservoir 14.

To provide comfortable handling, a lever 52 is disposed on the handle 46. The lever 52 is designed to receive the thumb of a user and keeps the lid 16 engaged to the pitcher top 12. A user may depress the lever 52, thus opening the lid 16 for adding water to the upper reservoir 18.

A back flow preventer 54 may also be added to the filter housing 20 for preventing water from flowing back into the filter housing 20, filter cartridge, and lower reservoir 14. The back flow preventer 54 allows filtered water to exit the filter housing 20, but does not allow the filtered water to reenter the filter housing 20. In other words, the back flow preventer 54 is a one-way valve and only allows filtered water to flow out of the filter housing 20 and into the base 24 of the lower reservoir 14.

In another alternative embodiment of the present invention, the pitcher top 12 is solid and covers the entire area of the upper reservoir 18. In other words, the pitcher top 12 does not contain a lid 16 for providing access to the upper reservoir 18 nor does the pitcher top 12 contain a cap 34 that provides access to the infusion tube 22. Instead, the user lifts the pitcher top 12 by depressing the level 52, thus providing access to the upper reservoir 18 and infusion tube 22. Alternatively, the pitcher top 12 may only contain the lid 16, requiring the user to lift the pitcher top 12 to access the infusion tube 22.

As can be seen from the foregoing description of the embodiments of the present invention, a new water filter infusion device has been invented. Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

We claim:

1. A water purifying and flavor infusion device comprising:
    a lower reservoir for storing filtered water,
    a pitcher top removably affixed to the lower reservoir, the pitcher top comprising:
        an upper reservoir, and
        a filter housing affixed to and extending below the upper reservoir, the filter housing adapted to contain a filter cartridge wherein the upper reservoir and the filter housing are in liquid communication,
        an infusion tube having an upper portion and a bottom portion and the upper portion includes a cap for allowing a user to insert an additive into the infusion tube without removing the pitcher top; and
    a hollow column with a constant diameter that extends from the pitcher top to the lower reservoir having an upper portion that receives an outer ring of the infusion tube for suspending the infusion tube within the lower reservoir.

2. The water purifying and flavor infusion device of claim 1, further comprising the lower reservoir contains a handle and a spout.

3. The water purifying and flavor infusion device of claim 1, further comprising a hollow column formed within the upper reservoir for receiving the infusion tube.

4. The water purifying and flavor infusion device of claim 1, further comprising a hollow column formed within the upper reservoir for receiving the infusion tube and having an upper portion, wherein an outer ring of the infusion device sits upon the upper portion of the column for allowing the infusion tube to be suspended within the lower reservoir.

5. The water purifying and flavor infusion device of claim 1, further comprising a pitcher top that includes a first opening for introducing water to the upper reservoir and a second opening in the pitcher top for introducing additives to the infusion tube.

6. The water purifying and flavor infusion device of claim 1, further comprising a collar positioned within the pitcher top for receiving a cap for enclosing the infusion tube.

7. The water purifying and flavor infusion device of claim 1, further comprising openings within the infusion tube for allowing filtered water from the lower reservoir to flow in and out of the infusion tube.

8. A method of purifying and infusing water in a pitcher with an additive comprising:

providing a water filter pitcher wherein the water filter pitcher includes a lower reservoir for storing filtered water, a pitcher top removably affixed to the lower reservoir, wherein the pitcher top comprises an upper reservoir for holding unfiltered water, a filter housing affixed to and extending below the upper reservoir, the filter housing adapted to contain a filter cartridge wherein the upper reservoir and the filter housing are in liquid communication, and hollow infusion tube containing a plurality of slots positioned within the lower reservoir for infusing filtered water with an additive, and a hollow column within the upper reservoir having an upper portion that receives an outer ring of the infusion tube for suspending the infusion tube within the lower reservoir;

adding water to said water filter pitcher,
permitting water to pass through said filter cartridge,
collecting filtered water in said lower reservoir, and
infusing said filtered water with an additive.

9. The method of purifying and infusing water of claim 8, further comprising infusing filtered water by allowing the filtered water to flow through the infusion tube.

10. The method of purifying and infusing water of claim 8, further comprising an infusion tube with a plurality of openings.

11. The method of purifying and infusing water of claim 8, further comprising adding an additive to the infusion tube.

12. The method of purifying and infusing water of claim 8, further comprising a column positioned within the upper reservoir for selectively securing the infusion tube and suspending the infusion tube within the lower reservoir.

13. The method of purifying and infusing water of claim 8, further comprising a spout positioned on the lower reservoir for pouring the filtered water.

* * * * *